Sept. 12, 1967   W. W. WOLFORD   3,341,245
MULTI-PACK CONTAINER CARRIER
Filed Jan. 24, 1966

INVENTOR.
WALLACE W. Wolford
BY Philip M. Rice
W. A. Schaich
ATTORNEYS

United States Patent Office 3,341,245
Patented Sept. 12, 1967

3,341,245
MULTI-PACK CONTAINER CARRIER
Wallace W. Wolford, Toledo, Ohio, assignor to Owens-Illinois, Inc., a corporation of Ohio
Filed Jan. 24, 1966, Ser. No. 522,576
1 Claim. (Cl. 294—87.2)

ABSTRACT OF THE DISCLOSURE

This invention relates to a plastic carrier for packaging two aligned rows of containers, such as beer cans, in a unitary package, characterized by the fact that the plastic carrier is produced by punching apertures in a sheet of plastic material and elongated strips of plastic material are respectively punched from the waste material removed from at least two of the apertures and the free ends of such strips are joined to form a carrying handle.

---

This invention relates to a multi-pack carrier for the unitary packaging of a plurality of containers, and more particularly to a simple plastic carrier for packaging two aligned rows of containers, such as beer cans, in a unitary package which is commonly referred to as a "six-pack carton."

It has been quite common to merchandise a plurality of bottles, cans, or jars in multi-packs, generally consisting of six-container units, although packs of four and eight have also appeared in the market place. Since the multi-pack unit is intended for a single use, namely, to carry the containers from the packers' plant to the retail store and then to the home or other point of consumption, where the carrier is thrown away, it is obvious that the construction of any multi-pack carrier should employ a minimum low cost material, and the manufacture of the carrier and assembly of the carrier on the containers should be accomplished automatically and at high speed so as to keep the cost of the disposable carrier to as low a level as possible.

Multi-pack carriers have heretofore been employed comprising a punched sheet of plastic material, for example, see United States Patent No. 2,874,835. Additionally, it has been proposed in Swick Patent No. 2,989,177 to integrally form a carrying handle for such sheet type carriers from the material of the sheet. Unfortunately, however, incorporation of an integral carrying handle in the plastic sheet results in the containers being spaced farther apart than is physically necessary so as to provide sufficient material in the sheet from which the carrying handle may be fabricated.

Accordingly, it is the object of this invention to provide an improved multi-pack carrier of the type constituting an apertured sheet of plastic material wherein the inserted containers may be disposed in substantially abutting relationship and an integral handle may be formed from the material of the sheet which would normally be punched out in forming the container receiving apertures.

Other objects and advantages of this invention will become apparent from the following description thereof, taken in conjunction with the annexed sheet of drawings on which there is shown a preferred embodiment of this invention.

Figure 1:
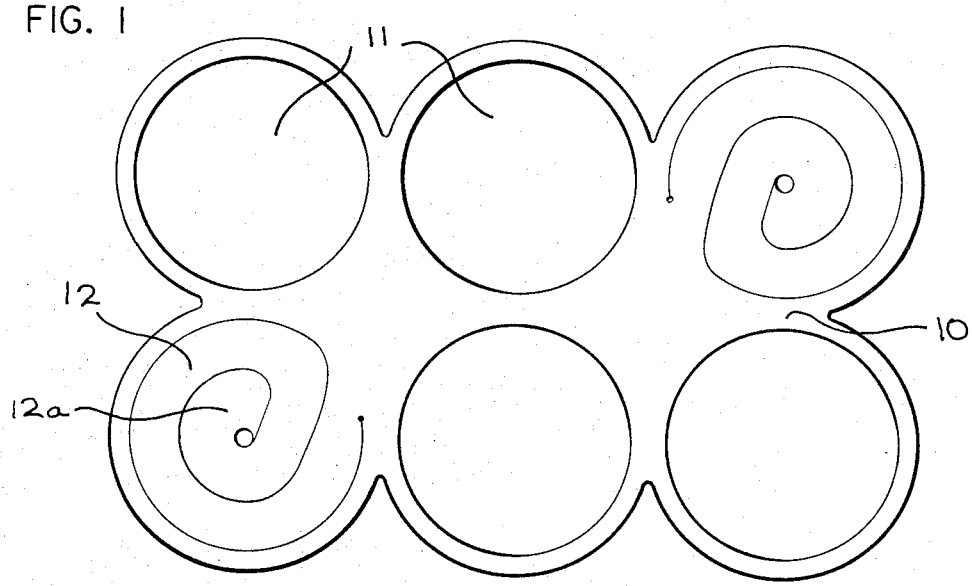
Figure 2:
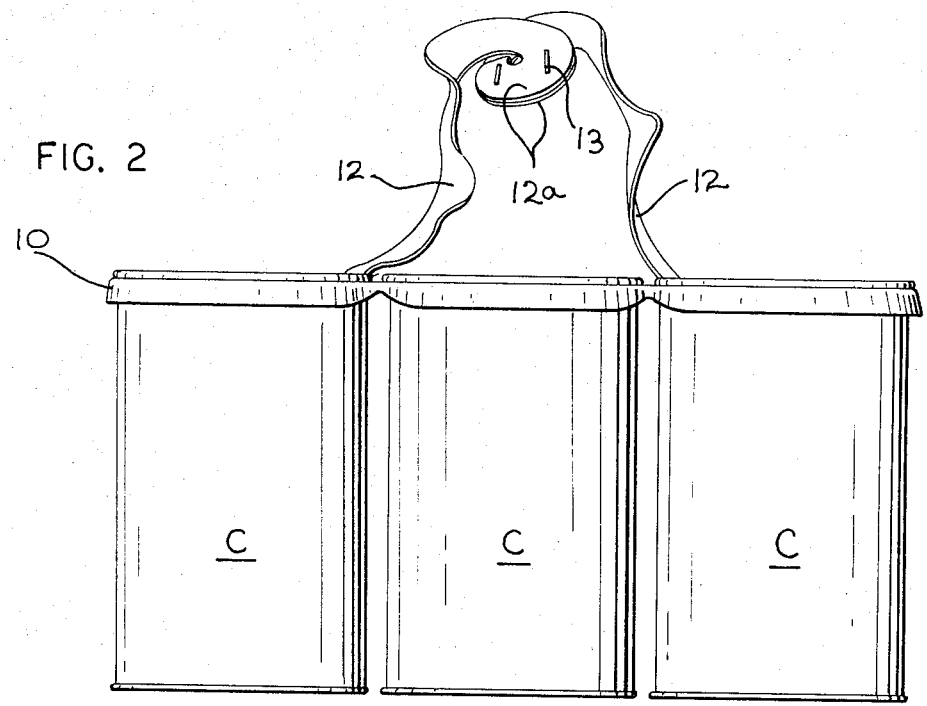

On the drawings:

FIGURE 1 is a plan view of a plastic carrier embodying this invention in its normal configuration prior to insertion of the containers therein; and FIGURE 2 is an elevational view illustrating the assembly of a carrier of the type shown in FIGURE 1 to six containers to form a "six-pack," and the completion of the handle portion for such carrier.

As shown on the drawings:

Referring to FIGURE 1, there is shown a carrier sheet 10 comprising a thin web of resilient plastic material such as polyethylene, polystyrene, polyvinyl chloride or any similar resilient plastic material which can be readily extruded in sheet form and which has a raw material cost sufficiently low so as to economically permit the use of the material as a disposable multi-pack carrier. A plurality of apertures 11 are punched out of the sheet 10, there being an aperture for each container which is desired to be assembled into the unitary package. Thus far the construction of the carrier sheet may be identical to that disclosed in the aforementioned United States Patent No. 2,874,835.

In accordance with this invention, the punched-out material for at least two oppositely spaced apertures 11 is not completely severed from the original sheet but instead is punched in the form of a generally helical strip 12 having a free end 12a and the other end being integral with the plastic sheet 10.

Referring to FIGURE 2, when the plastic carrier 10 is assembled to the desired number of containers, here illustrated as six containers C, the helical strips 12 are pushed out of the corresponding apertures 11 by the insertion of the containers C therein and the two free ends of the strips 12 are joined together as indicated at 13 by any conventional means, such as stapling, adhesive or heat seal.

It will be apparent that the helical configuration of each strip 12 will provide an elongated length of such strip in excess of the diameter of the aperture 11 from which the strip is formed and hence the strips 12 will have adequate length to extend above the plane of the carrier sheet 10 and the tops of the inserted containers C to provide a conveniently accessible carrying handle.

It will be obvious to those skilled in the art that this invention provides a sheet type carrier with an integral handle without increasing the amount of plastic utilized in the carrier and without requiring the containers to be spaced apart, thereby resulting in either a more economical or a smaller over-all volume package than the constructions of the prior art. It will be further evident that modifications of this invention can be made without departing from the teaching of this disclosure or the scope of the following claim.

What is claimed is:

In a multi-pack container carrier comprising a sheet of resilient plastic material, said sheet having a plurality of container receiving apertures punched therein, the improvement comprising a pair of elongated strips respectively punched from the sheet material removed from two of said apertures, each of said strips having one end thereof integrally united with the sheet and being originally formed in a generally helical configuration to provide such strip with an extended length in excess of the diameter of said aperture, the free ends of such strips being united to form a carrying handle.

References Cited

UNITED STATES PATENTS 2,822,208    2/1958    Then _____ 294—87.2
3,268,070    8/1966    Cunningham _____ 206—65

GERALD M. FORLENZA, *Primary Examiner.*

G. F. ABRAHAM, *Assistant Examiner.*